United States Patent [19]

Kameyama et al.

[11] Patent Number: 4,462,456
[45] Date of Patent: Jul. 31, 1984

[54] TRANSPORT ROLL FOR TRANSPORTING HOT MATERIAL AND TRAIN OF SUCH TRANSPORT ROLLS

[75] Inventors: Kazuhide Kameyama; Takahiro Kiyofuji; Yukinori Shigeyama, all of Sakai, Japan

[73] Assignee: Nippon Steel Corporation, Otemachi, Japan

[21] Appl. No.: 341,698

[22] Filed: Jan. 22, 1982

[30] Foreign Application Priority Data

Jan. 22, 1981 [JP] Japan ............................ 56-6474[U]
Jan. 22, 1981 [JP] Japan ............................ 56-6475[U]
Jan. 22, 1981 [JP] Japan ............................ 56-6476[U]
Jan. 22, 1981 [JP] Japan ............................ 56-6477[U]

[51] Int. Cl.³ .................... B22D 11/12; B21B 31/00
[52] U.S. Cl. .................................... 164/448; 29/132
[58] Field of Search ............... 164/442, 448; 29/121.1, 29/121.4, 121.5, 121.6, 132

[56] References Cited

U.S. PATENT DOCUMENTS 3,651,857 3/1972 Koch .................................. 164/448
3,815,197 6/1974 Sukenik ............................. 29/132
4,056,873 11/1977 Cassard et al. .................... 29/132
4,261,552 4/1981 Kameyama et al. ............. 164/263 X

FOREIGN PATENT DOCUMENTS 2710006 9/1978 Fed. Rep. of Germany ...... 164/448
45-415 1/1970 Japan .................................. 72/202
0302920 11/1977 U.S.S.R. ............................. 164/442

Primary Examiner—Nicholas P. Godici
Assistant Examiner—Jerold L. Johnson
Attorney, Agent, or Firm—Wenderoth, Lind & Ponack

[57] ABSTRACT

A transport apparatus comprising a plurality of metal rolls for transporting a hot heavy material is disclosed. Each roll is provided with a desired number of ring-like circumferential grooves which are filled with a heat insulating material, and the grooves of each roll are staggered with respect to the grooves of the adjacent rolls. In accordance with the present invention, the temperature drop of the hot heavy material during the transportation can be greatly reduced, and in addition, the temperature fluctuation in both the sectional direction and the longitudinal direction of the hot heavy material is sharply decreased. The invention contributes considerably to the realization of the direct rolling process on an industrial scale.

19 Claims, 20 Drawing Figures

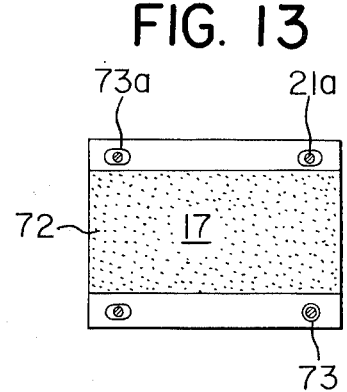
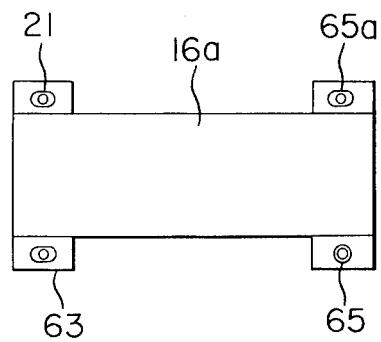
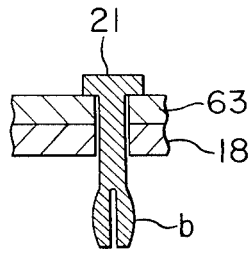
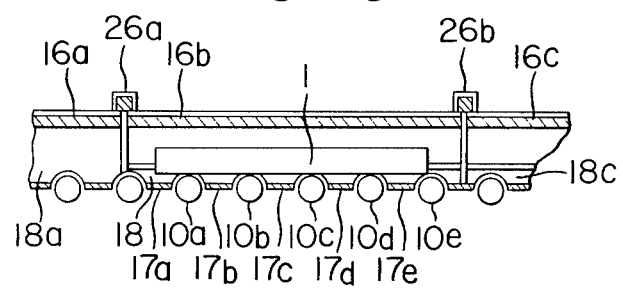
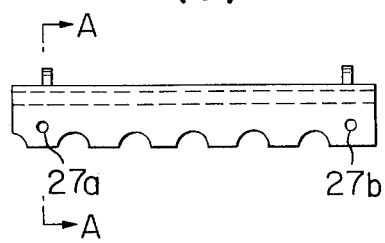
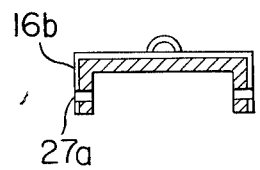

TRANSPORT ROLL FOR TRANSPORTING HOT MATERIAL AND TRAIN OF SUCH TRANSPORT ROLLS

BACKGROUND OF THE INVENTION

1. Field of the Invention

The present invention relates to a transport roll and a train of transport rolls for transporting a metal body in a hot state while the heat radiation therefrom is being prevented, and more particularly, to a transport roll and a train of transport rolls for transporting a hot slab or ingot emerging from a mold or a heating furnace.

2. Description of the Prior Art

The conventional transport roll for the transport of a steel ingot or slab heretofore used in steel making and rolling works has been of a heat-resistant, solid or hollow cylindrical type roll.

In transport rolls which transport a very hot and heavy material such as a hot slab emerging from the continuous casting process or a hot slab or bloom emerging from a heating or slabbing step to a subsequent processing step, several difficult problems are encountered. The train of transport rolls tends to incur thermal fatigue from the heat conducted directly from the hot material and from the radiant heat absorbed thereby; the rolls draw off heat from the hot material causing it to drop considerably in temperature; and the roll surfaces undergo severe deterioration.

Quite recently, with a view to attaining energy saving as well as high productivity, much work has gone into the development of a direct rolling process wherein the hot casting emerging from a continuous casting mold or the hot slab or bloom emerging from a slabbing step is delivered directly to a subsequent rolling step.

Such a hot casting, slab or bloom (referred to as "hot material" hereinafter) is continuously transported by the transport apparatus between prior and subsequent steps and, for carrying out the direct rolling step, it is of primary importance that the temperature drop of the hot material during its travel through the transport apparatus should be held to the minimum possible.

Since the hot material comes in direct touch with the transport rolls employed in the transport apparatus, its heat is conducted to the low temperature cold transport rolls and is radiated in all directions. As a result, the hot material falls in temperature so sharply that it is very difficult to transport it as far as the rolling stand before its temperature drops below the minimum required for the rolling step. No transport roll satisfactory for such a direct rolling process has been proposed heretofore.

Thus, the inventors of the present invention attempted to make the circumferential area of the transport rolls which comes in direct touch with the hot material as small as possible by providing grooves on the circumferential surface of the roll. The result was not, however, so remarkable as we had expected. We consider that this result occurred probably because cold air currents are generated in the grooves around the transport roll when the rolls rotate and these currents act to cool the hot material. Moreover, another unexpected problem came to light. It was found that cracks tend to occur at the bottom of the grooves, reducing the service life of the transport rolls. No doubt, these cracks occur because the bottom of the groove is subject to repeated thermal stresses. Next, we tried adhering heat resistant tape to the bottom of the grooves with a view to lessening the thermal shock. Although this was somewhat effective for preventing the occurrence of cracks, it did not eliminate the air currents which cool the hot material.

SUMMARY OF THE INVENTION

It is the principal object of the present invention to provide a transport roll which draws very little heat from the hot and heavy material but which is nevertheless so strong that its circumferential surface is hardly damaged.

It is another object of the invention to provide a train of transport rolls which reduces the temperature drop of the hot material to a considerable degree and prevents the occurrence of a non-uniform temperature distribution in the longitudinal direction and both sectional directions of the hot material.

It is still another object of the invention to provide a train of transport rolls for the transportation of a hot casting emerging from a continuous casting mold which makes it possible for the transported hot casting to be subsequently subjected to a direct rolling process on an industrial scale.

BRIEF DESCRIPTION OF THE DRAWINGS

Other and further objects of the invention will be better understood from the following detailed description with reference to the accompanying drawings, in which:

FIG. 13 is a plan view showing the manner of installation of the top heat insulating hood;

FIG. 14 is a plan view showing the manner of installation of the heat insulating board;

FIG. 15 is a partial sectional view showing an embodiment of a fastener pin;

FIG. 16 is a diagrammatic longitudinal sectional view of the transport apparatus;

FIG. 17(a) is a diagrammatic side view of the top heat insulating hood;

FIG. 17(b) is a diagrammatic horizontal sectional view of the top heat insulating hood;

DETAILED DESCRIPTION OF THE PREFERRED EMBODIMENTS

The transport roll in accordance with the present invention is provided with ring-like concave grooves (referred to as "groove" hereinafter) on its circumferential surface, and the grooves are filled with a heat insulating material up to near the level of the roll surface. The heat insulating material is firmly held by one or more layers of a winding member in order to prevent the heat insulating material from falling off due to centrifugal force during the revolution of the transport roll or owing to the deterioration of its quality by exposure to the heat of the hot material.

It is desired that the transport roll of the invention should draw off as little heat as possible from the hot material carried thereon. To increase the service life of a transport roll used for transporting a hot material, it might be proposed to use a hollow roll cooled by a cooling medium. A hollow roll would, however, draw off considerable heat and, therefore, would not meet one of the most important requirements of the invention. Accordingly, in the present invention it is required that a solid hard metal roll be used so as to keep the heat loss of the hot material as small as possible, and further, to assure that the roll will be of high strength.

The present invention will be described hereinbelow in detail with reference to the drawings.

Figure 1:
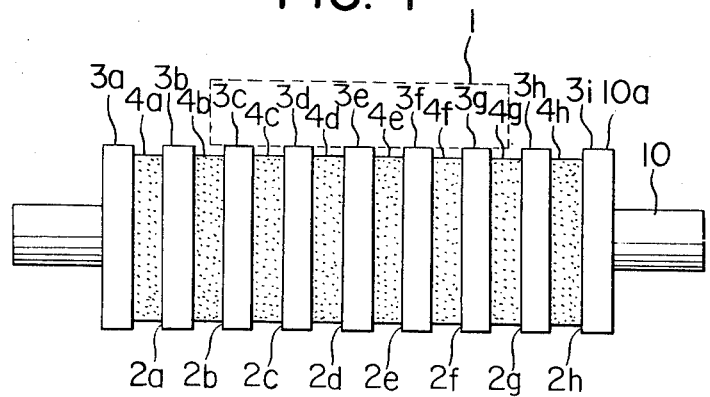
FIG. 1 is a diagrammatic front view of a transport roll in accordance with an embodiment of the present invention.

FIG. 1 is a diagrammatic front view of the transport roll of the invention in which the surface 10a of the roll 10 is provided with a plurality of circumferential grooves 2a–2h. The grooves 2 may be formed by any of several processes, such as, by the roll casting process, by cutting or machining a cast roll, or by fixing sleeve-like convex members on the roll surface 10a. Thus, the remainder of the roll surface 3a–3i is the solid hard metal part with which the hot material 1 comes in touch. Grooves 2a–2h are filled with a heat insulating material 4a–4h.

The width and number of roll surfaces 3a–3i and grooves 2a–2h depend on the weight and temperature of the hot material 1 to be transported and also on the degree of heat loss prevention desired. Good results were obtained with one embodiment of the invention in which the length of the cylindrical roll body was 1500–1800 mm, the roll diameter 400–450 mm, and both the surface width of the roll and the width of the groove 80–250 mm. Needless to say, however, the present invention is not limited to these dimensions.

The heat insulating material for the grooves and the winding layer wound thereover will be fully described hereinbelow.

FIGS. 2–6 are partial sectional views of the transport roll of the invention. The heat insulating material 4a–4h for the grooves 2a is selected from among rock wool, slag wool, glass wool, ceramic wool or the like, or a known refractory such as chamotte. These materials may be used singly or in combination, and a suitable amount of a binder or hardener may be mixed or added thereto.

The thickness of the heat insulating material 4a–4h should be determined in consideration of its heat holding effect, and it would differ according to the properties of the material or materials selected, but it is sufficient if it is in the range of 5–30 mm. Naturally, a thicker insulating material is more effective, but the strength of the roll 10 may be impaired because the depth of the groove 2 must be made greater.

Figure 2:
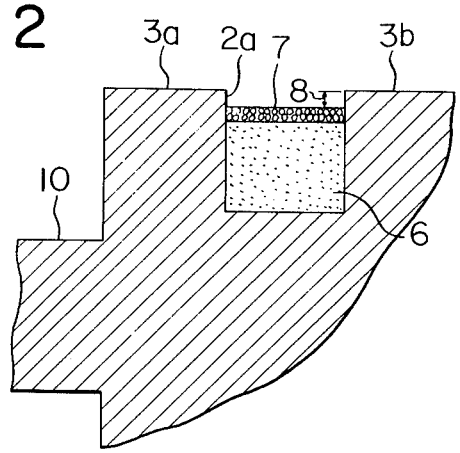
FIGS. 2-6 are partial sectional views of the transport roll of the invention.

The winding layer 7 may be, for instance, a metal wire band or metal plate band wound over the heat insulating material 6 at close enough intervals to prevent the material 6 from falling off the roll surface 3a and 3b in FIG. 2. Thus, the heat insulating material 6 is partly exposed on the roll surface 3a and 3b. The step 8, i.e. the difference in height between the roll surface 3a or 3b and the surface of the heat insulating material 6, is preferred to be as small as possible, but if it is made too small, there is a danger that either the heat insulating material 6 or the winding layer 7 may touch the hot material 1 and scratch or scar it. The inventors have obtained good results with a step 8 in the range of 3–20 mm.

Figure 3:
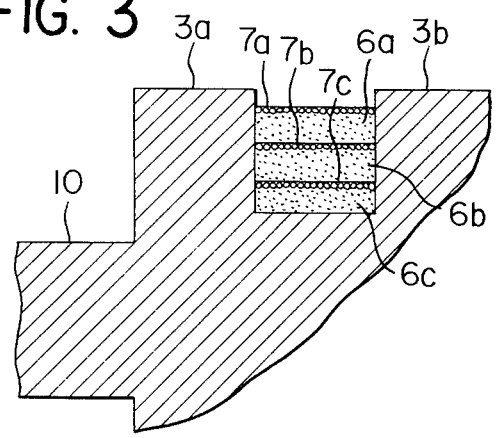

FIG. 3 shows an embodiment in which winding layers 7a–7c of metal net band are combined with heat insulating material 6a–6c in a layered construction. Although this structure is somewhat expensive to fabricate, it is highly durable and has an extended service life.

Figure 4:
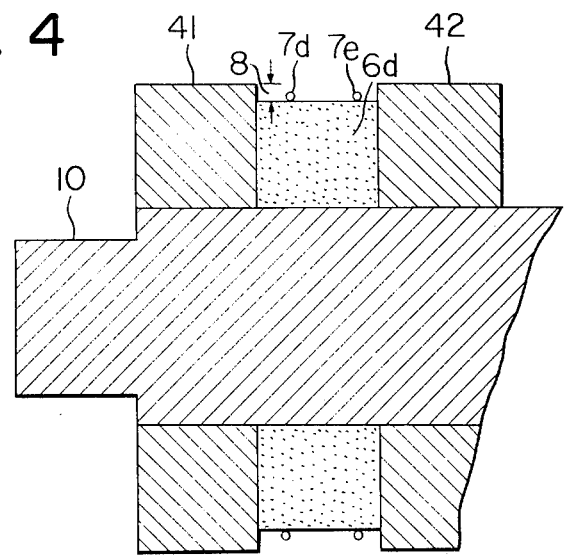

FIG. 4 shows another embodiment wherein the groove is filled with a heat insulating material 6d added with a self-hardener such as ceramic fiber and the so-formed insulating material 6d is wound with winding layers 7d, 7e each consisting of a single wire. In general, it is known that the self-hardening refractory material does not produce a hardening phenomenon, but assumes a desired shape; and after it has been formed to a certain shape, it hardens itself to exhibit its refractoriness when subjected to a natural or forced drying action. The advantage of this embodiment using a self-hardening refractory material, as shown in FIG. 4, is that it can be fabricated in a very short time. Further, in this embodiment, metallic sleeves 41, 42 are fitted around the roll body 10 by shrinkage to form grooves between the sleeves 41 and 42.

Figure 5:
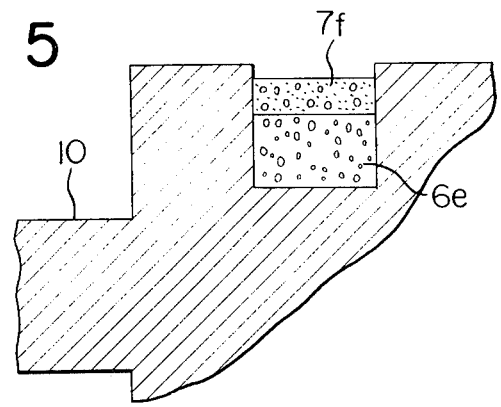

FIG. 5 is another embodiment wherein a formed heat insulating material 6e of ceramic fiber has been applied into the groove and then wound with a winding layer 7f comprised of a reticulated thread-like refractory such as ceramic woven cloth or cord. This embodiment is also easy to fabricate and highly effective but it is relatively expensive.

Figure 6:
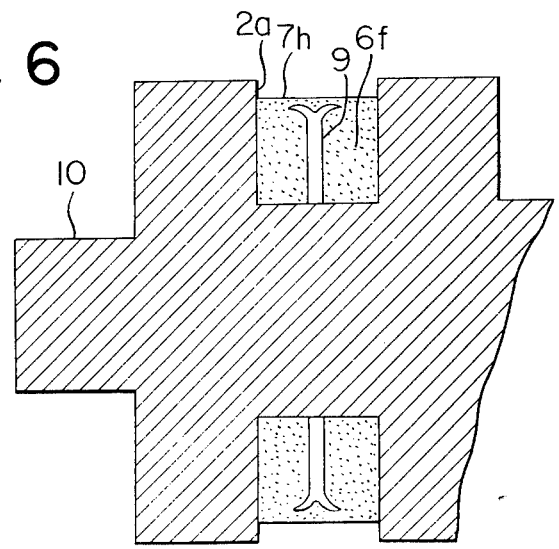

FIG. 6 is another embodiment in which a desired number of metal studs 9 are planted on the bottom of the groove 2a by welding or the like, whereafter the groove is filled with slag wool 6f. Following this step, a spray agent 7h consisting of a mixture of a self-hardening spray refractory material, such as refractory powder and an inorganic binder (which may also contain an organic substance), is sprayed thereon to form a heat insulating layer.

Figure 7:
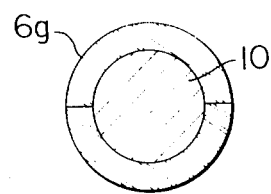
FIGS. 7 and 8 are sectional views of the transport roll of the invention.

FIG. 7 is another embodiment in which a heat insulating material 6g has been previously formed in the shape of two half-rings around a transport roll 10.

Figure 8:
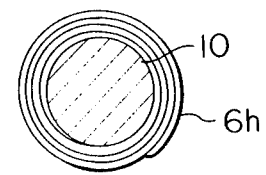

FIG. 8 is still another embodiment in which a plurality of sheet-like heat insulating materials 6h are wound in a multi-layer form around the outside of the roll body 10 as shown in a sectional view of a transport roll 10.

Since the grooves 2 provided around the roll surface 3a–3i do not function to support the hot material 1 in FIG. 1, the load on the metal layer of the roll 10 is increased accordingly, and this arrangement affects the service life of the roll 10. Therefore, it is desirable from the viewpoint of service life for the metal surface to be reinforced so as to enhance its heat resistance and its abrasion resistance. For example, a sleeve 41 or 42 shown in FIG. 4 and made of a stainless steel which has excellent heat and abrasion resistance can be fitted around the roll 10 or a similar material can be attached to the metal surface of the roll 6d by built-up welding or the metal surface can be treated by metal spraying of the agent 7h in FIG. 6 to harden it.

The thickness of the reinforced layer is preferred to be in the range of about 5–30 mm from the roll surface 10a of FIG. 1. If the difference of heat conductivity and thermal expansion between the roll 10 and the reinforced layer 7a is great as in FIG. 3, an intermediate layer 7b or 7c is preferably interposed between them.

It has been confirmed that the transport roll 10 of the invention decreases heat loss by 40-80% and enjoys an increase in service life by as much as 1.1-1.5 times, as compared with the conventional transport roll of prior art devices. Furthermore, since the area of the roll 10 coming in touch with the hot material 1 of the present invention is very small, the damage due to heat is also very small.

The inventors also carried out extensive research on trains of transport rolls 10 with the aim of reducing heat loss and damage to the roll surface 10a. Through our work, we have developed a novel train of transport rolls 10.

The train of transport rolls 10 comprises transport rolls 10 arranged in series in the transport direction of the hot material 1 wherein the circumferential surface 10a of each transport roll 10 is provided with grooves 2a-2h containing a heat insulating material 4a-4h and which surface 10a is also provided with contact metal surfaces 3a-3i that come in touch with the hot material 1. By the application of this train of transport rolls 10, we were successful in extending the service life of the transport rolls 10 and greatly reducing the amount of heat drawn from the hot material 1.

Figure 9:
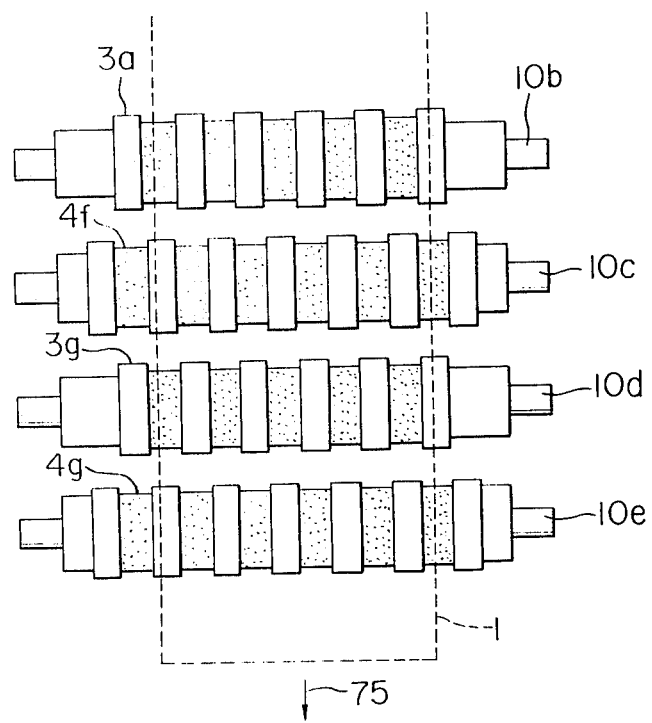
FIG. 9 is a diagrammatic explanatory view showing a train of transport rolls of the invention.

FIG. 9 is a plan view of a train of transport rolls 10 according to the invention in which transport rolls 10b-10e are arranged in the direction of transport as shown by an arrow 75, and the hot material (slab) 1 indicated in dotted line is transported thereby.

In FIG. 9, the transport roll 10b and the adjacent transport roll 10c in the forward direction 75 are offset from each other so that the contact metal surface 3a of the roll 10b is aligned with the heat insulated surface 4f of the roll 10c in the transport direction 75. This staggered arrangement is also used with the other transport rolls, i.e. heat-insulated surface 4f of the roll 10c is aligned with metal contacting surface 3g of roll 10d, and metal contacting surface 3g of the roll 10d is aligned with heat-insulated surface 4g of the roll 10c. In other words, the contact metal surfaces 3 of one transport roll 10 are in line with the heat insulated surfaces 4 of the next transpoert roll 10 in the direction 75 of transporting the hot material 1. In this case, however, it is preferred that the width of the heat insulated surface 4f should be larger than that of the contact metal surface 3a.

Accordingly, it follows from the above arrangement of the contact metal surfaces 3 and heat insulated surfaces 4 of the transport roll 10 that the heat loss owing to heat conduction is greatly reduced because the bottom of the hot material 1 comes in touch with a metal surface 3 only at every other transport roll 10.

The difference in effectiveness between the train of transport rolls 10 of this invention and that of prior art is as follows: the durability of the train of rolls 10 of the invention is 10-50% longer and hence the service life is lengthened; the train of rolls 10 of the invention reduces heat loss by 5-40% over that of a conventional train. With one embodiment, the temperature drop over 50 m in an application to a direct rolling process was 150° C. less with the train of rolls 10 of this invention than with the conventional train of rolls 10.

Another embodiment of the train of transport rolls 10 of the invention is described below.

Figure 10:
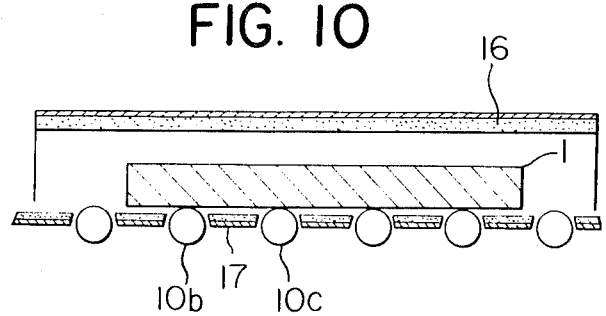
FIG. 10 is a sectional view of the construction of a transport apparatus.
Figure 11:
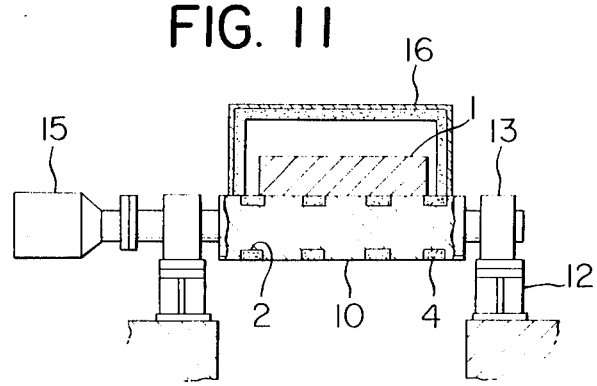
FIG. 11 is a horizontal sectional view showing the manner of installation of a transport roll.

FIG. 10 is a sectional view of a transport apparatus including a train of transport rolls 10 in accordance with an embodiment in which the transport rolls 10 are rotatably mounted, as shown in a sectional view in FIG. 11, by means of bearings 13 disposed on pedestals 12, the plurality of transport rolls 10 being arranged along the transport line of the hot material 1. In FIG. 11, there is shown an electric motor 15 which drives the transport roll 10. The transport roll 10 is provided with a desired number of grooves 2 around its circumferential surface and the grooves 2 are filled with a heat insulation material such as ceramic fiber or the like.

As shown in FIG. 9, the metal contact surface 3a is offset from the heat insulated surface 4f in the arrangement of the train of transport rolls 10.

As shown in FIG. 10, gaps between the transport rolls 10, for instance, the gap between the rolls 10b and 10c, are provided with a heat insulating board 17 and a top heat insulating hood 16 detachably disposed above the train of transport rolls 10.

Figure 12:
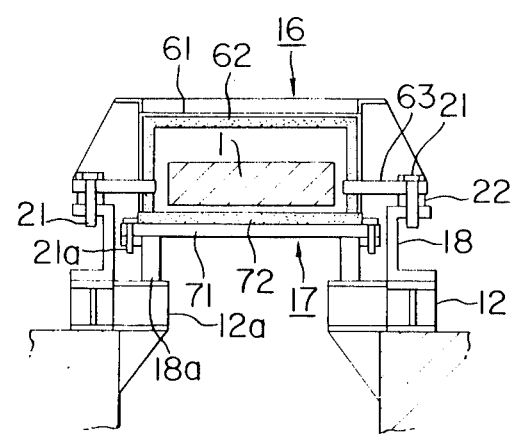
FIG. 12 is a horizontal sectional view showing an embodiment of a top heat insulating hood or cover and a heat insulating board.

FIG. 12 is a sectional view showing an embodiment in connection with the heat insulating boards 17 and the top heat insulating hood 16. In this embodiment, the top heat insulating hood 16 comprises a frame 61 whose inner side is lined with a heat insulating material 62 in order to enhance its heat insulation. The top heat insulating hood 16 is fixed to a support frame 63 secured to a support means 18 firmly disposed on the pedestal 12.

In addition, in FIG. 12, there is shown a fastener pin 21 which, as explained hereinafter, prevents the top heat insulating hood 16 from moving by more than a specified distance in either the transverse or transport directions. A washer 22 is also shown. The top heat insulating hood 16 can be easily installed or detached by removing the fastener pin 21. Similarly, the heat insulating board 17 consists of a sheet-like frame 71 lined with a heat insulating material 72, and the board 17 is detachably provided on a support means 18a secured to a pedestal 12a via a fastener pin 21a.

FIG. 13 is a plan view showing an example of how the heat insulating board 17 is fixed. An arbitrary one of the fixing holes 73 through which fastener pins 21a pass is somewhat larger in diameter than that of the fastener pin 21a and is formed concentric with the pin 21a. The remaining holes are formed as slit-like holes 73a, which are larger in width and length than the fastener pin 21a. Since the heat insulating board 17 is positioned near the hot material 1, it expands and contracts by exposure to heat. With the described arrangement, the heat insulating board 17 can freely expand and contract within a specified range because of the combination of the fixing holes 73 having a long slit and the fastener pins 21a. As a result, damage to the board 17 due to thermal stress can be effectively prevented.

The above prevention means has been described in connection with the heat insulating board 17, but similar prevention means may be provided for the top heat insulating hood 16. For instance, as shown in FIG. 14, the top heat insulating hood 16a can be divided into a suitable number of unit hoods and each unit can be provided with a means similar to the above. For example, a circular hole 65, an oblong hole 65a, and a fastener pin 21 can be provided to attain a similar purpose. Referring to the fastener pins 21,21a, in FIGS. 13, 14, it is proposed that they should not be tightly screwed up using a known nut or cotter pin. As indicated in FIG. 12 and FIG. 15, they can function better if they are allowed to depend under their own weight through the holes 73,73a and 65,65a. If necessary, the lower part of the fastener pin 21 or 21a may be provided with a removal preventing means, for example, a bulge b formed by elastic deformation.

With the above-mentioned construction, the fastener pins 21,21a are not screwed up but are retained by their own weight and thus can be very easily detached. In addition, it has been confirmed by experiment that the pressure at the contact surface between the support frame 63 and the support means 18, as shown in FIG. 15, or between the heat insulating board 17 and the support means 18a, as shown in FIG. 12, becomes almost equal to the weight of the top insulating hood 16 or the heat insulating board 17 so that effective absorption of thermal expansion and contraction as indicated in FIGS. 13 and 14, can be fully realized.

As mentioned above, in the transport apparatus of the invention, the portion of the transport route between the rolls 10 is closed by the heat insulating board 17 while the space above the train of transport rolls is covered by the top heat insulating hood 16. Hence the transport route through which the hot material 1 travels is constructed almost as if it were a closed tunnel. Besides, the transport rolls 10 are provided with metal contact surfaces 3a and heat insulated surfaces 4a in staggered arrangement so that not only is it possible to prevent the overall temperature drop of the hot material 1, it is also possible to prevent local temperature drops thereof.

Furthermore, in accordance with another embodiment of the invention, a desired number of detecting ray apertures are provided at the height of transport of the hot material in a transport apparatus having the space above transport rolls covered with a heat insulating hood so that the hot material is transported with the apparatus almost completely closed, and a number of laser ray position detectors equal to the number of the apertures are disposed at positions corresponding to the height of the apertures. A controller is provided to command a motor to drive the transport rolls upon receipt of an input signal from the laser ray position detectors. The transport apparatus provided with the laser ray position detector is particularly effective for the operation of the train of transport rolls of the invention.

FIG. 16 is a diagrammatic longitudinal section of a transport apparatus of the heat loss prevention type according to the invention in which the hot material 1 is transported on transport rolls 10a-10e in an almost closed state, and the top heat insulating hoods 16a, 16b and 16c, each formed as a half closed cabinet, are detachably installed on side supports 18a-18c in the transport direction so as to precisely cover the group of transport rolls 10a-10e. In FIG. 16, a plurality of heat insulating boards 17a-17e, provided between the transport rolls 10a-10e, respectively, are detachably installed on the support (not shown) for the transport rolls 10a-10e, and a plurality of saddle-type auxiliary heat insulating hoods or covers 26a and 26b are provided so as to allow greater tolerance in the fixing of the heat insulating hoods 16a-16c. With this arrangement, gaps for absorbing the thermal expansion of the heat insulating hoods 16a-16c can be closed.

Referring more particularly to the transport apparatus of the above specified construction, high effectiveness in prevention of heat loss can be attained because of the substantially closed structure but the hot material 1 is entirely hidden from the outside observation so that control of the transport process is apt to be inaccurate.

Figure 18:
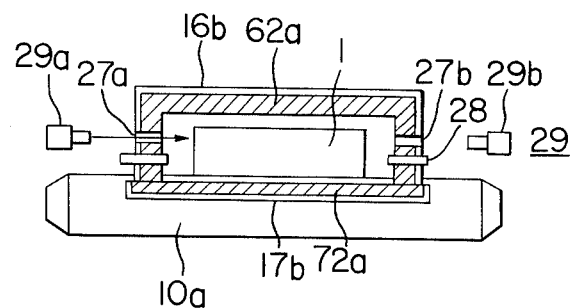
FIG. 18 is an explanatory view showing the position of a laser ray position detector.

In another embodiment of the invention shown in sections (a) and (b) of FIG. 17, each side of the heat insulating hood 16b is provided with apertures 27a and 27b through which a detecting light ray passes. As shown in FIG. 18, a laser ray position detector 29 comprising a laser ray transmitter 29a and a receiver 29b is installed at the apertures 27a and 27b facing each other. This arrangement enables safe and accurate transport of the hot material 1 without a substantial increase in the heat loss since the operation of transport rolls 10a can be controlled on the basis of signals obtained when the hot slab 1 intercepts the laser ray.

The apertures 27a and 27b may be closed by heat resistant glass or other material which transmits light rays. In FIG. 18, a heat insulating layer 62a is bonded, and a protruding metal member 28 is provided to prevent a direct contact of the hot slab 1 with the heat insulating layer 62a.

Figure 19:
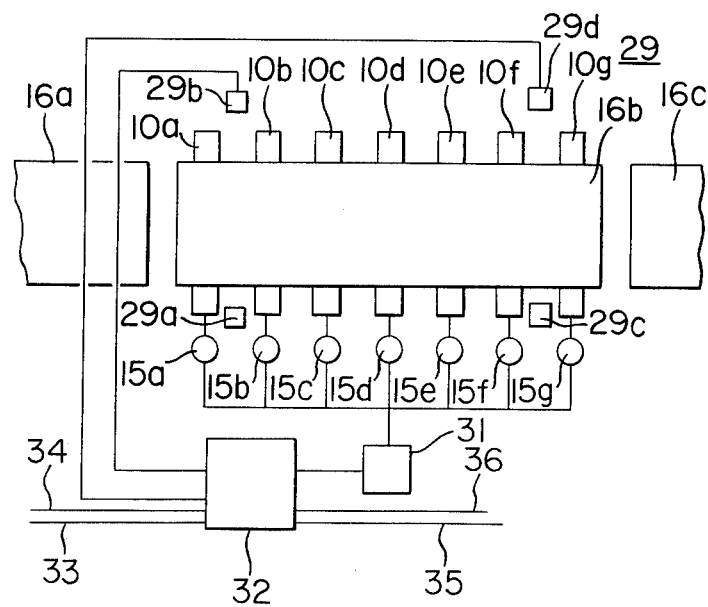
FIG. 19 is a diagrammatic view showing the manner of control of the whole system of the invention.

FIG. 19 is a diagrammatic explanatory view showing a control means of the invention. The means has a laser ray position detector 29 comprised of one pair of detectors 29a, 29b and another pair of similar detectors 29c, 29d. Electric motors 15a-15g, provided to drive the transport rolls 10a-10g, respectively, are electrically coupled to a drive means 31 including an electric power switch. A controller 32 gives a drive command to the drive means 31 in response to an input signal from the laser ray position detector 29. For instance, controller 32 receives the input signals via input circuits 33 and 34 from the laser ray position detectors for the drive transport rolls 10a-10g at the preceding and following stages (not shown). Then the controller 32 issues commands via output circuits 35 and 36 to control the drive means 31 of the transport rolls 10a-10g of the preceding and following stages so as to smoothly transport a plurality of hot materials 1 at a specified interval therebetween.

A laser ray position detector 29 is used because the hot material 1 to be transported is generally a high-temperature luminous body and the light from the hot slab 1 tends to reflect within the heat insulating hood 16b and would cause an ordinary photoelectric detector to malfunction frequently.

Although the present invention has been fully described in connection with the direct rolling system for a hot casting emerging from the continuous casting process, it is understood that the transport roll 10 of the invention may be used in other fields of technology without departing from the spirit and scope of the invention.

We claim:

1. A transport roll for transporting a heavy hot material comprising:
   a solid hard metal roll provided on its roll surface with a plurality of ring-like circumferential grooves,
   said roll surface between the grooves acting as a metal contacting surface in direct contact with the underside of the heavy hot material,
   each of said grooves being partially filled with a heat insulating material to form a heat insulated surface,
   said heat insulated surface having its top side parallel to but spaced from the metal contacting surface and spaced below the metal contacting surface by a height difference defining a recessed step, said recessed step having a depth which is in a ratio ranging from about 0.012 to about 0.25 with the width of each of said grooves, whereby only the metal contacting surface supports the heavy hot material, and the heat insulated surface prevents heat loss from the heavy hot material without being in direct contact with said heavy hot material.

2. A transport roll as claimed in claim 1 wherein said heat insulating material is a form-fitting body.

3. A transport roll as claimed in claim 1 wherein said heat insulating material is comprised of two half-ring shaped bodies.

4. A transport roll as claimed in claim 1 wherein said heat insulating material is a self-hardening refractory.

5. A transport roll as claimed in claim 1 wherein said heat insulating material is formed as a band.

6. A transport roll as claimed in claim 1 wherein said heat insulating material is fastened to the metal roll by a plurality of studs planted at the bottom of said groove.

7. A transport roll as claimed in claim 1 wherein an outer layer of the metal contacting surface of the metal roll is a heat resistant and abrasion resistant layer.

8. A transport roll as claimed in claim 1 in which said heat insulating material is held by at least one winding layer.

9. A transport roll as claimed in claim 8 wherein said winding layer includes one of a metal wire band and a metal net band.

10. A transport roll as claimed in claim 8 wherein said winding layer includes one of an incombustible refractory heat insulating filament net and cloth.

11. A transport roll as claimed in claim 8 wherein said winding layer includes a self-hardening refractory material.

12. A transport roll as claimed in claim 8 wherein said winding layer is constructed as a plurality of layers having non-woven heat insulating material layers therebetween.

13. A transport roll as claimed in claim 8 wherein said heat insulating material has a form-fitting body and said winding layer is a self-hardening spray material layer.

14. A transport roll as claimed in claim 1 in which the depth of said recessed step is in the range of 3 to 20 millimeters and the width of each of said grooves is in the range of 80 to 250 millimeters.

15. A transport roll for transporting a hot material comprising a solid metal roll provided with a desired number of ring-like circumferential grooves each filled with heat insulating material and one or more winding layers which retain said heat insulating material wherein said heat insulating material is fastened by a plurality of studs planted at the bottom of said groove, said winding layer is formed of a net-like band and is fastened by said studs, and a spray refractory heat insulating layer is formed on said net-like band winding layer.

16. A train of transport rolls for transporting a heavy hot material comprising:
   a train of transport rolls, said transport rolls being solid hard metal rolls,
   each of said solid hard metal rolls being provided on its roll surface with a plurality of ring-like circumferential grooves,
   said roll surface between said grooves acting as a plurality of metal contacting surfaces in direct contact with the underside of the heavy hot material,
   said grooves being partially filled with a heat insulating material to form a plurality of heat insulated surfaces,
   said plurality of heat insulated surfaces having top sides parallel to and spaced from said plurality of metal contacting surfaces and below the metal contacting surface by height differences defining recessed steps aligned in the transport direction of the heavy hot material,
   said recessed steps having depths which are in ratios ranging from about 0.012 to about 0.25 with the widths of said grooves,
   one metal contacting surface of each transport roll being aligned with the heat insulated surface of an adjacent transport roll,
   whereby only the metal contacting surfaces support the heavy hot material, and the heat insulated surfaces prevent heat loss from the heavy hot material without being in direct contact with said heavy hot material.

17. A train of transport rolls for transporting a hot material as claimed in claim 16 wherein the width of each of said grooves is larger than the width of each of said metal contacting surfaces.

18. A train of transport rolls for transporting a heavy hot material as claimed in claim 16, further comprising:
   pedestals on which said transport rolls are rotatably and detachably mounted,
   freely detachable heat insulating plates closing the space between adjacent transport rolls, and
   a top heat insulating hood covering the train of transport rolls.

19. A train of transport rolls as claimed in claim 16 in which the depth of each of said recessed steps is in the range of 3 to 20 millimeters and the width of each of said grooves is in the range of 80 to 250 millimeters.

* * * * *